(12) United States Patent
Kim et al.

(10) Patent No.: US 11,314,450 B2
(45) Date of Patent: Apr. 26, 2022

(54) METHOD OF OPERATING STORAGE DEVICE, STORAGE DEVICE PERFORMING THE SAME AND METHOD OF OPERATING STORAGE SYSTEM USING THE SAME

(71) Applicant: SAMSUNG ELECTRONICS CO., LTD., Suwon-si (KR)

(72) Inventors: Dong-Woo Kim, Suwon-si (KR); Dong-Min Kim, Hwaseong-si (KR); Song-Ho Yoon, Yongin-si (KR); Wook-Han Jeong, Pocheon-si (KR)

(73) Assignee: SAMSUNG ELECTRONICS CO., LTD., Suwo-si (KR)

( * ) Notice: Subject to any disclaimer, the term of this patent is extended or adjusted under 35 U.S.C. 154(b) by 297 days.

(21) Appl. No.: 16/416,872

(22) Filed: May 20, 2019

(65) Prior Publication Data

US 2020/0133571 A1    Apr. 30, 2020

(30) Foreign Application Priority Data

Oct. 31, 2018  (KR) .................. 10-2018-0131859

(51) Int. Cl.
*G06F 3/06*     (2006.01)
*G06F 12/10*   (2016.01)
*G06F 13/28*   (2006.01)

(52) U.S. Cl.
CPC .......... *G06F 3/0659* (2013.01); *G06F 3/0604* (2013.01); *G06F 3/0679* (2013.01);
(Continued)

(58) Field of Classification Search
None
See application file for complete search history.

(56) References Cited

U.S. PATENT DOCUMENTS 6,871,237 B2   3/2005  Han et al.
7,679,133 B2   3/2010  Son et al.
(Continued)

FOREIGN PATENT DOCUMENTS

KR    10-1420754        7/2014
KR    10-2017-0081126   7/2017

OTHER PUBLICATIONS

Extended European Search Report dated Mar. 4, 2020 in Corresponding European Patent Application No. 19190440.8.

*Primary Examiner* — Gary W. Cygiel
(74) *Attorney, Agent, or Firm* — F. Chau & Associates, LLC

(57) ABSTRACT

A method of operating a storage device includes receiving, at the storage device, a meta information transfer command based on a data read request. The meta information transfer command is received from a host device. The method further includes receiving, at the storage device, a data read command corresponding to the data read request and the meta information transfer command. The data read command is received from the host device. The method further includes receiving, at the storage device, a plurality of meta data corresponding to the data read request and the meta information transfer command. The plurality of meta data is received from the host device. The method further includes performing a data read operation, at the storage device, based on the data read command and the plurality of meta data.

20 Claims, 16 Drawing Sheets

(52) U.S. Cl.
CPC .............. *G06F 12/10* (2013.01); *G06F 13/28* (2013.01); *G06F 2212/7201* (2013.01)

(56) References Cited

U.S. PATENT DOCUMENTS

| | | |
|---|---|---|
| 8,553,466 B2 | 10/2013 | Han et al. |
| 8,559,235 B2 | 10/2013 | Yoon et al. |
| 8,654,587 B2 | 2/2014 | Yoon et al. |
| 8,966,176 B2 | 2/2015 | Duzly et al. |
| 9,176,673 B2 | 11/2015 | Watanabe |
| 9,544,370 B2 | 1/2017 | Tanaka et al. |
| 2011/0233648 A1 | 9/2011 | Seol et al. |
| 2013/0297894 A1* | 11/2013 | Cohen .................... G06F 3/0611 711/154 |
| 2016/0306594 A1 | 10/2016 | Kim et al. |
| 2017/0131917 A1 | 5/2017 | Yun et al. |
| 2017/0153826 A1* | 6/2017 | Cho .......................... G06F 13/16 |
| 2017/0192902 A1 | 7/2017 | Hwang et al. |
| 2017/0269858 A1* | 9/2017 | Nimmagadda ..... G06F 11/1004 |
| 2018/0088867 A1 | 3/2018 | Kaminaga et al. |

\* cited by examiner

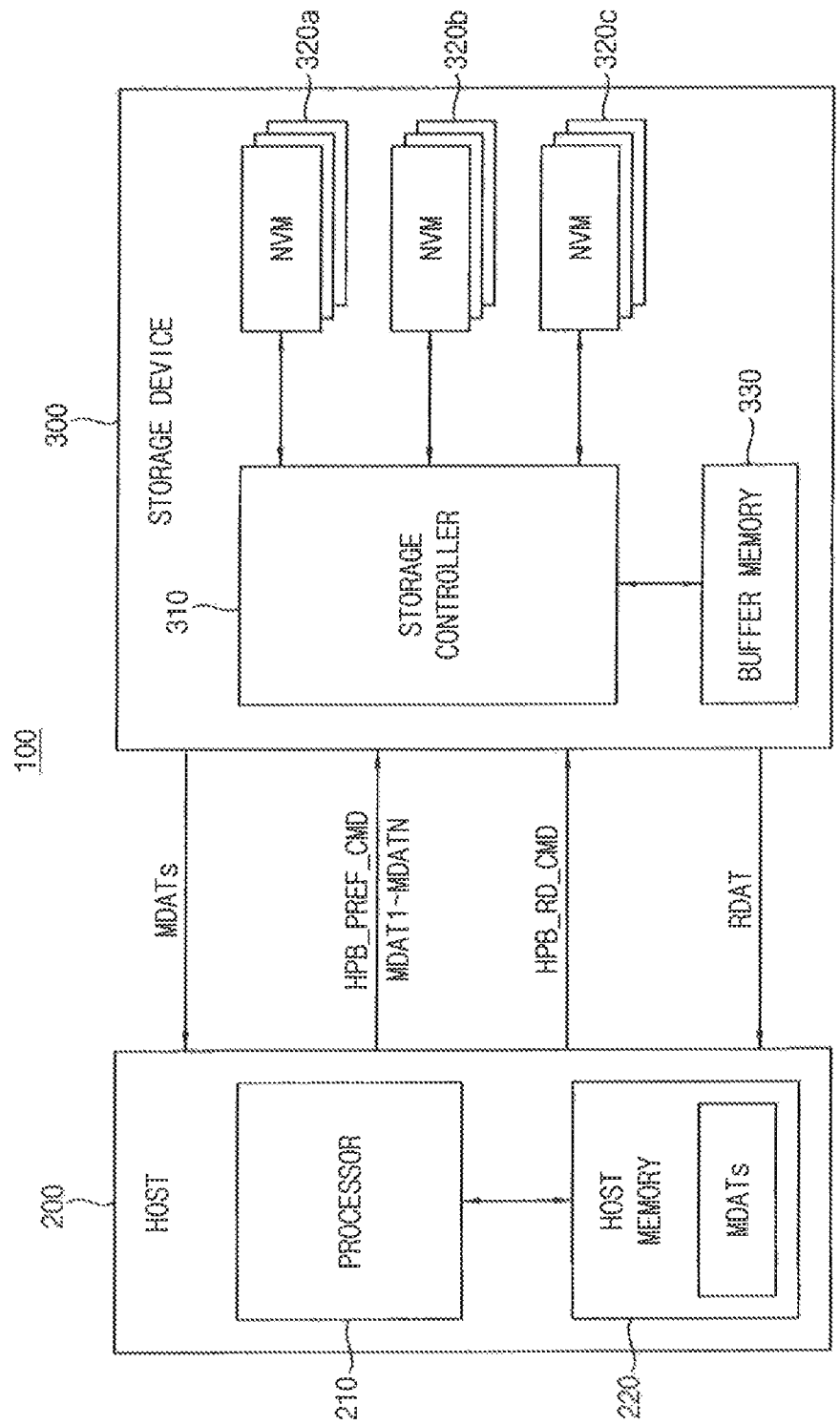

FIG. 4

| BIT<br>BYTE | 7 | 6 | 5 | 4 | 3 | 2 | 1 | 0 |
|---|---|---|---|---|---|---|---|---|
| 0 | HPB_PREF_OPCD ||||||||
| 1 | RESERVED |||||| IMMED | OBSOL |
| 2 | HPB_PREF_LBA ||||||||
| 3 | ||||||||
| 4 | ||||||||
| 5 | ||||||||
| 6 | HPB_PREF_ID ||||||||
| 7 | HPB_PREF_LENG ||||||||
| 8 | ||||||||
| 9 | HPB_PREF_CON ||||||||

FIG. 5

| BIT<br>BYTE | 7 | 6 | 5 | 4 | 3 | 2 | 1 | 0 |
|---|---|---|---|---|---|---|---|---|
| 0 | colspan=8 HPB_RD_OPCD |||||||||
| 1 | FUA | HPB_RD_ID |||||||
| 2 | colspan=8 HPB_RD_LBA |||||||||
| ⋮ | | | | | | | | |
| 5 | | | | | | | | |
| 6 | colspan=8 HPB_RD_ENTRY |||||||||
| ⋮ | | | | | | | | |
| 13 | | | | | | | | |
| 14 | RESERVED |||| HPB_RD_GRN ||||
| 15 | colspan=8 HPB_RD_TLENG |||||||||

FIG. 6

| BIT<br>BYTE | 7 | 6 | 5 | 4 | 3 | 2 | 1 | 0 |
|---|---|---|---|---|---|---|---|---|
| 0 | | | | | | | | |
| ⋮ | \multicolumn{8}{c}{HPB_PREF_ENTRY1} |
| 7 | | | | | | | | |
| 8 | | | | | | | | |
| ⋮ | \multicolumn{8}{c}{HPB_PREF_ENTRY2} |
| 15 | | | | | | | | |
| ⋮ | \multicolumn{8}{c}{⋮} |
| 8(N-1) | | | | | | | | |
| ⋮ | \multicolumn{8}{c}{HPB_PREF_ENTRYN} |
| 8N-1 | | | | | | | | |

METHOD OF OPERATING STORAGE DEVICE, STORAGE DEVICE PERFORMING THE SAME AND METHOD OF OPERATING STORAGE SYSTEM USING THE SAME

CROSS-REFERENCE TO RELATED APPLICATIONS

This application claims priority under 35 U.S.C. § 119 to Korean Patent Application No. 10-2018-0131859, filed on Oct. 31, 2018 in the Korean Intellectual Property Office (KIPO), the disclosure of which is incorporated by reference herein in its entirety.

TECHNICAL FIELD

Exemplary embodiments relate generally to semiconductor integrated circuits, and more particularly, to methods of operating storage devices, storage devices performing the methods, and methods of operating storage systems using the methods.

DISCUSSION OF THE RELATED ART

A storage system includes a host device and a storage device. The storage device may be a memory system including a memory controller and a memory device or including only a memory device. In the storage system, the host device and the storage device are connected to each other through various interface standards such as, for example, universal flash storage (UFS), serial advanced technology attachment (SATA), small computer system interface (SCSI), serial attached SCSI (SAS), embedded multi-media card (eMMC), etc. The host device includes a host memory that is separated from the storage device.

SUMMARY

Exemplary embodiments of the present inventive concept provide a method of operating a storage device capable of efficiently reading a large amount of data.

Exemplary embodiments of the present inventive concept provide a storage device performing the method and capable of efficiently reading the large amount of data.

Exemplary embodiments of the present inventive concept provide a method of operating a storage system using the method of operating the storage device.

According to exemplary embodiments, a method of operating a storage device includes receiving, at the storage device, a meta information transfer command based on a data read request. The meta information transfer command is received from a host device. The method further includes receiving, at the storage device, a data read command corresponding to the data read request and the meta information transfer command. The data read command is received from the host device. The method further includes receiving, at the storage device, a plurality of meta data corresponding to the data read request and the meta information transfer command. The plurality of meta data is received from the host device. The method further includes performing a data read operation, at the storage device, based on the data read command and the plurality of meta data.

According to exemplary embodiments, a storage device includes a plurality of nonvolatile memories and a storage controller. The plurality of nonvolatile memories store a plurality of data. The storage controller controls an operation of the plurality of nonvolatile memories. The storage controller receives a meta information transfer command based on a data read request, receives a data read command corresponding to the data read request and the meta information transfer command, receives a plurality of meta data corresponding to the data read request and the meta information transfer command, and performs a data read operation based on the data read command and the plurality of meta data.

According to exemplary embodiments, a method of operating a storage system that includes a host device and a storage device includes transmitting a plurality of meta data stored in the storage device to the host device, storing the plurality of meta data in a host memory included in the host device, transmitting a meta information transfer command from the host device to the storage device based on a data read request, transmitting a data read command corresponding to the data read request and the meta information transfer command from the host device to the storage device, and transmitting first meta data corresponding to the data read request and the meta information transfer command from the host device to the storage device. The first meta data is a part of the plurality of meta data. The method further includes performing a data read operation on the storage device based on the data read command and the first meta data.

According to exemplary embodiments, a storage system includes a host device and a storage device. The storage device is configured to transmit a plurality of meta data stored in the storage device to the host device. The host device is configured to store the plurality of meta data transmitted by the storage device in a host memory included in the host device, transmit a meta information transfer command to the storage device based on a data read request, transmit a data read command corresponding to the data read request and the meta information transfer command to the storage device, and transmit first meta data corresponding to the data read request and the meta information transfer command to the storage device. The first meta data is a part of the plurality of meta data. The storage device is further configured to perform a data read operation based on the data read command and the first meta data.

In the method of operating the storage device, the method of operating the storage system and the storage device according to exemplary embodiments, a large amount of meta data may be stored or accumulated in the host memory, two commands (e.g., the meta information transfer command and the data read command) and the large amount of meta data (e.g., associated meta data) may be received based on a single data read request, and the data read operation (e.g., a large-scale read operation) may be performed based on the received data read command and the received meta data. Accordingly, a large amount of data and/or various sizes of data may be efficiently read.

BRIEF DESCRIPTION OF THE DRAWINGS

The above and other features of the present inventive concept will become more apparent by describing in detail exemplary embodiments thereof with reference to the accompanying drawings, in which:

FIG. 2 is a block diagram illustrating a storage device and a storage system including the storage device according to exemplary embodiments.

FIG. 4 is a diagram illustrating an example of a meta information transfer command used in a method of operating a storage device according to exemplary embodiments.

FIG. 5 is a diagram illustrating an example of a data read command used in a method of operating a storage device according to exemplary embodiments.

FIG. 6 is a diagram illustrating an example of a plurality of meta data used in a method of operating a storage device according to exemplary embodiments.

DETAILED DESCRIPTION OF THE EXEMPLARY EMBODIMENTS

Figure 1:
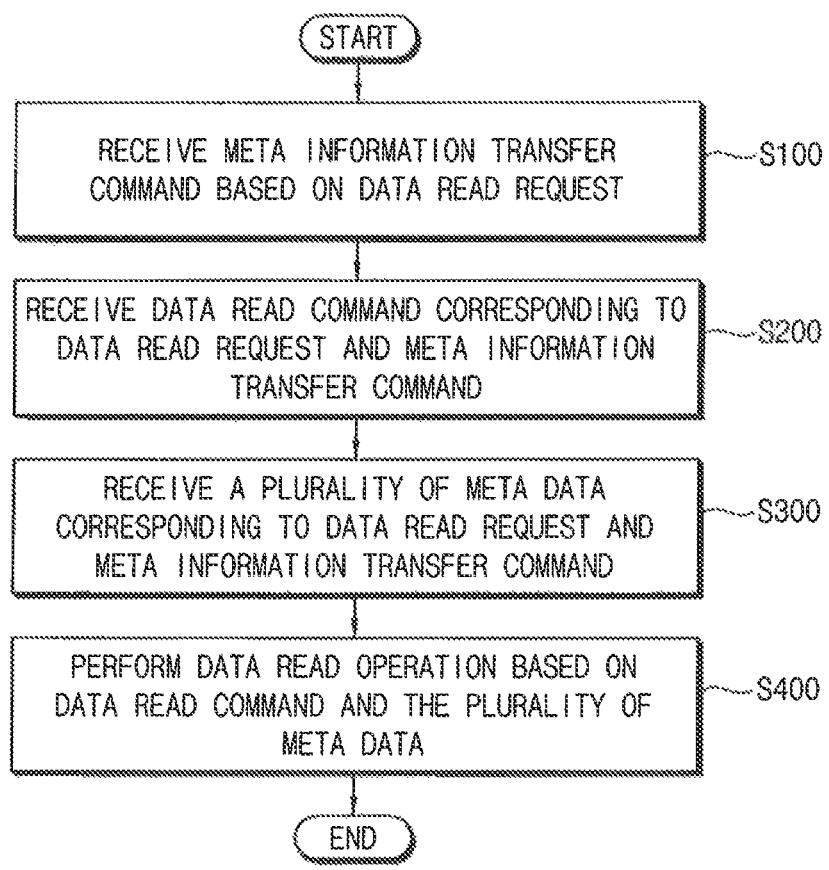
FIG. 1 is a flowchart illustrating a method of operating a storage device according to exemplary embodiments.

Exemplary embodiments of the present inventive concept will be described more fully hereinafter with reference to the accompanying drawings. Like reference numerals may refer to like elements throughout the accompanying drawings.

FIG. 1 is a flowchart illustrating a method of operating a storage device according to exemplary embodiments.

Referring to FIG. 1, a storage device according to exemplary embodiments performs a data read operation based on commands received from an external host device. Configurations of the storage device and a storage system including the storage device will be described with reference to FIG. 2.

In a method of operating the storage device according to exemplary embodiments, the storage device receives a meta information transfer command based on a data read request (operation S100), receives a data read command corresponding to the data read request and the meta information transfer command (operation S200), and receives a plurality of meta data corresponding to the data read request and the meta information transfer command (operation S300). As will be described with reference to FIGS. 8 through 11, operation S100 may be performed first, operations S200 and S300 may be performed later, and an order of operations S200 and S300 may be changed. For example, according to exemplary embodiments, operation S200 may be performed before operation S300, or operation S300 may be performed before operation S200.

All of the meta information transfer command, the data read command and the plurality of meta data may be provided from the external host device. In addition, the plurality of meta data may include information associated with a plurality of physical addresses for performing the data read operation. Configurations of the meta information transfer command, the data read command and the plurality of meta data will be described with reference to FIGS. 4, 5 and 6, respectively.

The storage device performs the data read operation based on the data read command and the plurality of meta data (operation S400).

In exemplary embodiments, the data read request may be a large-scale read request in which a large amount of data greater than a predetermined size are read at one time or sequentially, and thus, the data read operation may be a large-scale read operation. For example, the predetermined size may be a size of data read out by one normal data read request and one normal data read command.

In exemplary embodiments, the data read request may be a single read request. For example, two commands (e.g., the meta information transfer command and the data read command) and a large amount of meta data may be received concurrently and/or sequentially based on the single data read request, and the data read operation (e.g., the large-scale read operation) may be performed based on the two commands and the large amount of meta data.

The storage device according to exemplary embodiments may operate based on a host performance booster (HPB) scheme or a host memory buffer (HMB) scheme. The HPB scheme represents that a host memory included in the host device is used as a cache memory of the storage device by storing meta data associated with an operation of the storage device in the host memory. Typically, a buffer memory included in the storage device may have relatively small capacity, and thus, may not be able to store all of the meta data for the storage device at one time. In addition, nonvolatile memories typically included in the storage device and used as data storage space may have an operating speed slower than those of the buffer memory and the host memory. The host memory may have a capacity larger than that of the buffer memory and an operating speed faster than that of the nonvolatile memory, and thus, an access performance to the storage device may be improved by using the host memory as the cache memory of the storage device. Thus, exemplary embodiments use the host memory as the cache memory of the storage device, as described in further detail below.

In the method of operating the storage device according to exemplary embodiments, the large amount of meta data may be stored or accumulated in the host memory based on the HPB scheme, the two commands (e.g., the meta information transfer command and the data read command) and the large amount of meta data (e.g., associated meta data) may be received based on the single data read request, and the data read operation (e.g., the large-scale read operation) may be performed based on the received data read command and the received meta data. Accordingly, a large amount of data and/or various sizes of data may be efficiently read.

FIG. 2 is a block diagram illustrating a storage device and a storage system including the storage device according to exemplary embodiments.

Referring to FIG. 2, a storage system 100 includes a host device 200 and a storage device 300.

The host device 200 controls overall operations of the storage system 100. The host device 200 may include a processor 210 and a host memory 220.

The processor 210 may control an operation of the host device 200. For example, the processor 210 may execute an operating system (OS). As will be described with reference to FIGS. 3A and 3B, the operating system may include a file system for file management and a device driver for controlling peripheral devices including the storage device 300 at the operating system level. The processor 210 may include at least one of various processing units such as, for example, a central processing unit (CPU).

The host memory 220 may store instructions and/or data that are executed and/or processed by the processor 210. The host memory 220 may be a memory device having a relatively high or rapid operating speed. For example, the host memory 220 may be a memory device having a relatively high or rapid operating speed compared to nonvolatile memories 320a, 320b and 320c and/or a buffer memory 330 of the storage device 300. The host memory 220 may include at least one of various volatile memories such as, for example, a dynamic random access memory (DRAM).

In addition, the host memory 220 may receive all of meta data MDATs associated with an operation of the storage device 300 from the storage device 300 to store the meta data MDATs. All of the meta data MDATs may also be referred to herein as a plurality of metadata MDATs. For example, the meta data MDATs may be internally stored in the storage device 300, and may be provided from the storage device 300 to the host memory 220 when the storage system 100 is booted (e.g., powered-on) or reset. The storage system 100 may operate based on the HPB scheme in which the storage device 300 is accessed using the meta data MDATs stored in the host memory 220, and thus, the access performance to the storage device 300 may be improved.

The storage device 300 is accessed by the host device 200. The storage device 300 may include a storage controller 310, a plurality of nonvolatile memories 320a, 320b and 320c, and a buffer memory 330.

The storage controller 310 may control an operation of the storage device 300 such as, for example, a data read operation, based on a command and data that are received from the host device 200. For example, the storage controller 310 may receive a meta information transfer command HPB_PREF_CMD, a data read command HPB_RD_CMD and a plurality of meta data MDAT1~MDATN from the host device 200, may perform the data read operation based on the meta information transfer command HPB_PREF_CMD, the data read command HPB_RD_CMD and the plurality of meta data MDAT1~MDATN to read target data RDAT (e.g., data to be retrieved), and may output the target data RDAT to the host device 200.

The plurality of nonvolatile memories 320a, 320b and 320c may store a plurality of data. For example, the plurality of nonvolatile memories 320a, 320b and 320c may store the meta data MDATs, the target data RDAT, various user data, etc.

In exemplary embodiments, each of the plurality of nonvolatile memories 320a, 320b and 320c may include at least one of various nonvolatile memories such as, for example, an electrically erasable programmable read only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The buffer memory 330 may store instructions and/or data that are executed and/or processed by the storage controller 310, and may temporarily store data stored in or to be stored into the plurality of nonvolatile memories 320a, 320b and 320c. The buffer memory 330 may include at least one of various volatile memories such as, for example, a static random access memory (SRAM).

In exemplary embodiments, a capacity of the host memory 220 may be greater than a capacity of the buffer memory 330.

In exemplary embodiments, the storage device 300 may be a universal flash storage (UFS). In exemplary embodiments, the storage device 300 may be one of a solid state drive (SSD), a multi media card (MMC), an embedded multi media card (eMMC), a secure digital (SD) card, a micro SD card, a memory stick, a chip card, a universal serial bus (USB) card, a smart card, a compact flash (CF) card, etc.

In exemplary embodiments, the storage device 300 may be connected to the host device 200 through a block accessible interface which may include, for example a UFS, an eMMC, a serial advanced technology attachment (SATA) bus, a nonvolatile memory express (NVMe) bus, a serial attached SCSI (SAS) bus, etc. The storage device 300 may use a block accessible address space corresponding to an access size of the plurality of nonvolatile memories 320a, 320b and 320c to provide the block accessible interface to the host device 200 for allowing the access by units of a memory block with respect to data stored in the plurality of nonvolatile memories 320a, 320b and 320c.

In exemplary embodiments, the storage system 100 may be any mobile system such as, for example, a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an Internet of things (IoT) device, an Internet of everything (IoE) device, an e-book reader, a virtual reality (VR) device, an augmented reality (AR) device, a robotic device, etc. In exemplary embodiments, the storage system 100 may be any computing system such as, for example, a personal computer (PC), a server computer, a workstation, a digital television, a set-top box, a navigation system, etc.

Figure 3A:
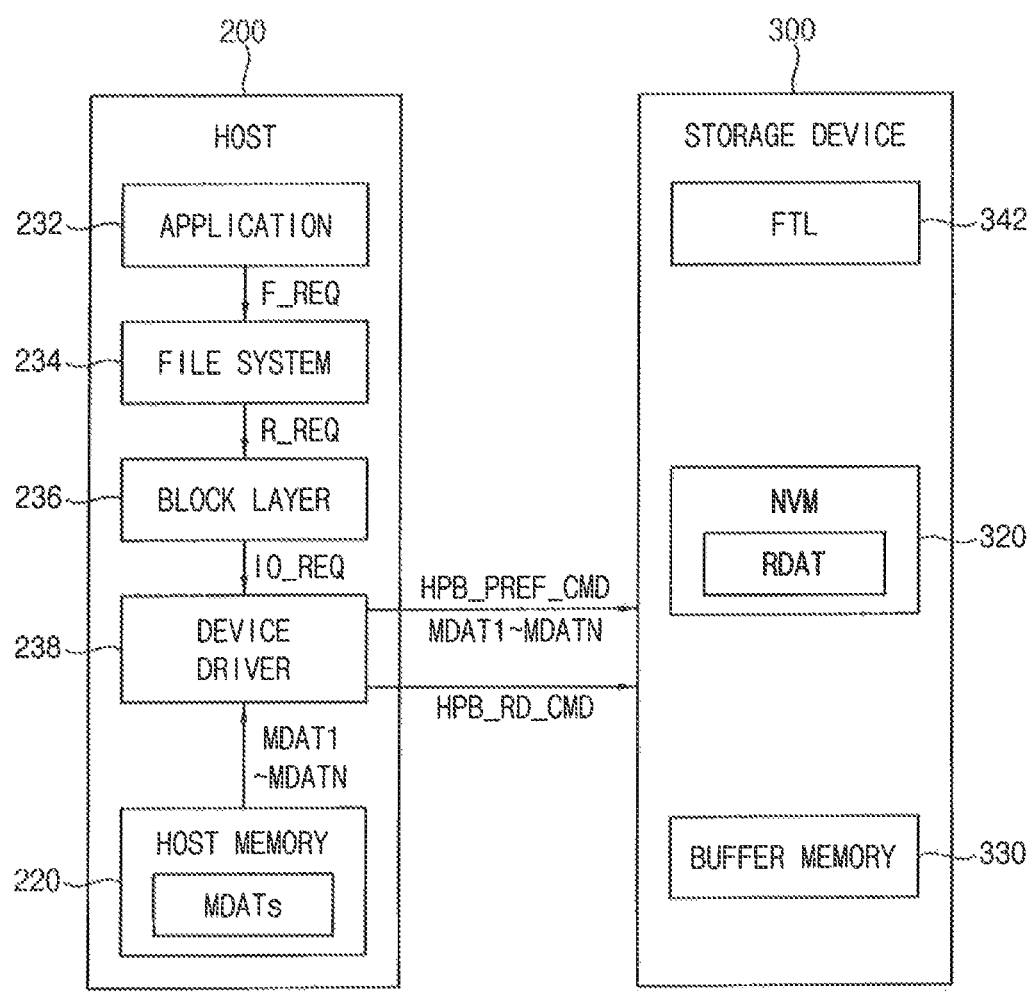
FIGS. 3A and 3B are diagrams for describing a method of operating a storage device according to exemplary embodiments.
Figure 3B:
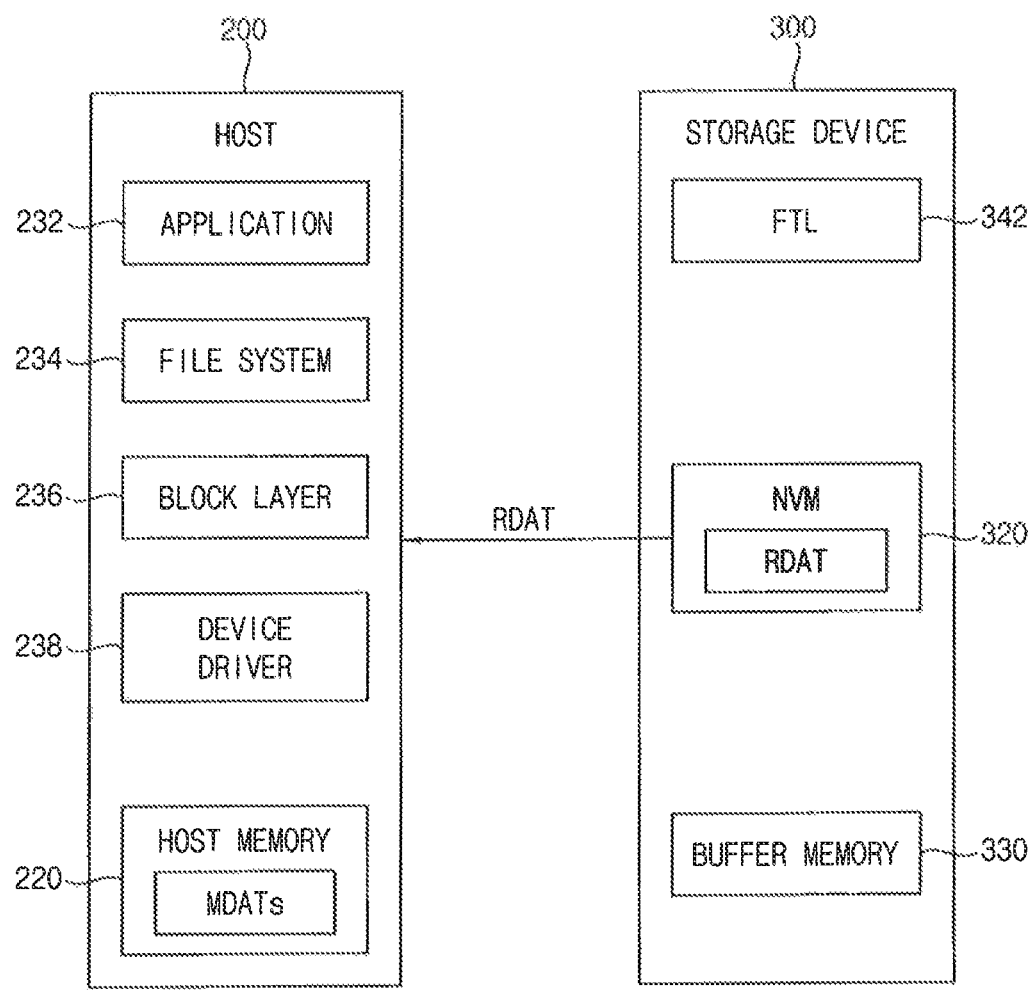

FIGS. 3A and 3B are diagrams for describing a method of operating a storage device according to exemplary embodiments. FIGS. 3A and 3B conceptually illustrate a software hierarchical structure and a storage space structure of the host device 200 and the storage device 300 in FIG. 2.

Referring to FIGS. 3A and 3B, the host device 200 may include an application 232, a file system 234, a block layer 236, a device driver 238 and the host memory 220. The storage device 300 may include a flash translation layer (FTL) 342, at least one nonvolatile memory 320 and the buffer memory 330. The application 232, the file system 234, the block layer 236 and the device driver 238 of the host device 200 may be referred to as a high level. The flash translation layer 342 and the nonvolatile memory 320 of the storage device 300 may be referred to as a low level.

The application 232 may be an application software program that is executed on an operating system. For example, the application 232 may be programmed to aid in generating, copying and deleting a file. The application 232 may provide various services such as, for example, a video application, a game application, a web browser application, etc.

The file system 234 may manage files used by the host device 200. The file system 234 may manage, for example, file names, extensions, file attributes, file sizes, cluster information, etc. of files accessed by requests from the host device 200 or applications executed by the host device 200. The file system 234 may generate, delete and manage data on a file basis. For example, the file system 234 may manage the files based on a log-structured scheme in which data and meta data are written sequentially to a circular buffer, called a log.

The block layer 236 may be referred to as a block input/output layer, and may perform data read/write operations by units of a memory block. For example, the block accessible interface may be implemented based on the block layer 236.

The device driver 238 may control the storage device 300 at the operating system level. The device driver 238 may be, for example, a software module of a kernel for controlling the storage device 300. The host device 200 or the applications executed by the host device 200 may request the data read/write operations to the storage device 300 via the device driver 238.

The host memory 220 in FIGS. 3A and 3B may be substantially the same as the host memory 220 in FIG. 2. For example, when the storage system 100 is booted or reset, the host device 200 may receive all of the meta data MDATs of the storage device 300, may store the meta data MDATs in the host memory 220, and may access the storage device 300 using the meta data MDATs stored in the host memory 220, as described with reference to FIG. 2.

The flash translation layer 342 may translate a logical address provided from the host device 200 into a physical address in the nonvolatile memory 320, and may manage data stored in the nonvolatile memory 320.

The nonvolatile memory 320 and the buffer memory 330 in FIGS. 3A and 3B may be substantially the same as the nonvolatile memories 320a, 320b and 320c and the buffer memory 330 in FIG. 2, respectively. For example, the nonvolatile memory 320 may store the meta data MDATs, the target data RDAT and the user data, and may perform data read/write/erase operations, as described with reference to FIG. 2. The buffer memory 330 may temporarily store data stored in or to be stored into the nonvolatile memory 320.

The method of operating the storage device of FIG. 1 will be described with reference to FIGS. 3A and 3B.

First, as illustrated in FIG. 3A, the application 232 may generate a file request F_REG for a specific file stored in the storage device 300. The file system 234 may generate a read request R_REQ corresponding to the file request F_REG, and the block layer 236 may generate an input/output request IO_REQ corresponding to the read request R_REQ. At least one of the file request F_REG, the read request R_REQ and the input/output request IO_REQ may indicate the data read request described with reference to FIG. 1, and the data read request may be a single read request. For example, as used herein, the data read request may refer to at least one of the file request F_REG, the read request R_REQ and the input/output request IO_REQ.

The device driver 238 may generate the meta information transfer command HPB_PREF_CMD and the data read command HPB_RD_CMD based on the data read request to transmit the meta information transfer command HPB_PREF_CMD and the data read command HPB_RD_CMD to the storage device 300. Since the meta data MDATs are stored in the host memory 220 based on the HPB scheme, the device driver 238 may transmit the plurality of meta data MDAT1~MDATN corresponding to the data read request to the storage device 300. The plurality of meta data MDAT1~MDATN may be a part of the meta data MDATs stored in the host memory 220.

In exemplary embodiments, the meta information transfer command HPB_PREF_CMD may be transmitted first, and then the data read command HPB_RD_CMD and the plurality of meta data MDAT1~MDATN may be transmitted later. A transmission order of the data read command HPB_RD_CMD and plurality of meta data MDAT1~MDATN may be changed. Examples of the data read operation according to the transmission order of the data read command HPB_RD_CMD and plurality of meta data MDAT1~MDATN will be described with reference to FIGS. 8 through 11.

In exemplary embodiments, the plurality of meta data MDAT1~MDATN may be transmitted through a direct memory access (DMA) interface. The plurality of meta data MDAT1~MDATN may be transmitted more rapidly by using the DMA interface.

In exemplary embodiments, all of the meta information transfer command HPB_PREF_CMD, the data read command HPB_RD_CMD and the plurality of meta data MDAT1~MDATN may be transmitted through the same transmission line. In exemplary embodiments, the meta information transfer command HPB_PREF_CMD and the data read command HPB_RD_CMD may be transmitted through a command transmission line, and the plurality of meta data MDAT1~MDATN may be transmitted through a data transmission line different from the command transmission line.

Next, as illustrated in FIG. 3B, the storage device 300 may perform the data read operation based on the data read command HPB_RD_CMD and the plurality of meta data MDAT1~MDATN to read the target data RDAT stored in the nonvolatile memory 320, and may transmit the target data RDAT to the host device 200. The target data RDAT may be temporarily stored in the buffer memory 330, and then may be transmitted to the host device 200.

Although FIGS. 3A and 3B illustrate an example in which the meta information transfer command HPB_PREF_CMD, the data read command HPB_RD_CMD and the plurality of meta data MDAT1~MDATN are directly output from the device driver 238 and the target data RDAT is directly output from the nonvolatile memory 320, exemplary embodiments of the inventive concept are not limited thereto. For example, in exemplary embodiments, the host device 200 may include a host interface that provides an interface for the storage device 300, and/or the storage device 300 may include a memory interface that provides an interface for the nonvolatile memory 320 and/or a host interface that provides an interface for the host device 200. The host interface in the host device 200 may output the meta information transfer command HPB_PREF_CMD, the data read command HPB_RD_CMD and the plurality of meta data MDAT1~MDATN. The memory interface in the storage device 300 may receive the target data RDAT from the nonvolatile memory 320. The host interface in the storage device 300 may receive the meta information transfer command HPB_PREF_CMD, the data read command HPB_RD_CMD and the plurality of meta data MDAT1~MDATN from the host device 200, and may output the target data RDAT.

FIG. 4 is a diagram illustrating an example of a meta information transfer command used in a method of operating a storage device according to exemplary embodiments.

Referring to FIG. 4, a field of the meta information transfer command HPB_PREF_CMD may include an operation code HPB_PREF_OPCD, reserved bits RESERVED, an immediate bit IMMED, an obsolete bit OBSOL, logical block address information HPB_PREF_LBA, a meta information transfer identification (ID) HPB_PREF_ID, a length code HPB_PREF_LENG and a control code HPB_PREF_CON. The meta information transfer command HPB_PREF_CMD may be referred to as a command for transferring a large amount of meta data or an HPB prefetch command.

The operation code HPB_PREF_OPCD may be for indicating that the meta information transfer command HPB_PREF_CMD and may be set to, for example, "FAh." The control code HPB_PREF_CON may be set to, for example, "00h." The length code HPB_PREF_LENG may indicate a length of the meta information transfer command HPB_PREF_CMD.

The logical block address information HPB_PREF_LBA may indicate at least one logical block address for the data read operation based on the meta information transfer command HPB_PREF_CMD.

The meta information transfer ID HPB_PREF_ID may be used for identifying the meta information transfer command HPB_PREF_CMD and the corresponding data read command HPB_RD_CMD. For example, as described above, one meta information transfer command HPB_PREF_CMD and one data read command HPB_RD_CMD may be generated in one pair based on one data read request. If there is a plurality of data read requests, a plurality of meta information transfer commands and a plurality of data read commands corresponding thereto may be generated, and thus, it may be identified using the meta information transfer ID HPB_PREF_ID that each meta information transfer command corresponds to which data read request and which data read command. As will be described with reference to FIG. 5, the data read command HPB_RD_CMD may include a read ID HPB_RD_ID corresponding to the meta information transfer ID HPB_PREF_ID.

FIG. 5 is a diagram illustrating an example of a data read command used in a method of operating a storage device according to exemplary embodiments.

Referring to FIGS. 2 and 5, a field of the data read command HPB_RD_CMD may include an operation code HPB_RD_OPCD, a force unit access (FUA) bit FUA, the read ID HPB_RD_ID, logical block address information HPB_RD_LBA, entry information HPB_RD_ENTRY, reserved bits RESERVED, a group number code HPB_RD_GRN and a transfer length code HPB_RD_TLENG. The data read command HPB_RD_CMD may be referred to as an HPB read command.

The operation code HPB_RD_OPCD may be for indicating that data read command HPB_RD_CMD and may be set to, for example, "88h." The group number code HPB_RD_GRN may be set to, for example, "11h." The transfer length code HPB_RD_TLENG may indicate a length of the data read command HPB_RD_CMD.

The read ID HPB_RD_ID may be used for identifying the data read command HPB_RD_CMD and the corresponding meta information transfer command HPB_PREF_CMD. The read ID HPB_RD_ID in FIG. 5 may correspond to the meta information transfer ID HPB_PREF_ID in FIG. 4. For example, it may be identified using the read ID HPB_RD_ID that each data read command corresponds to which data read request and which meta information transfer command.

In exemplary embodiments, when the meta information transfer command HPB_PREF_CMD of FIG. 4 and the data read command HPB_RD_CMD of FIG. 5 are generated based on the same data read request, the meta information transfer ID HPB_PREF_ID in FIG. 4 and the read ID HPB_RD_ID in FIG. 5 may have the same value. For example, when the meta information transfer ID HPB_PREF_ID and the read ID HPB_RD_ID have the same value, it may be confirmed that the meta information transfer command HPB_PREF_CMD including the meta information transfer ID HPB_PREF_ID and the data read command HPB_RD_CMD including the read ID HPB_RD_ID are a pair of commands corresponding to each other.

The logical block address information HPB_RD_LBA may indicate at least one logical block address for the data read operation based on the data read command HPB_RD_CMD. For example, when the meta information transfer ID HPB_PREF_ID and the read ID HPB_RD_ID have the same value, the logical block address information HPB_PREF_LBA in FIG. 4 and the logical block address information HPB_RD_LBA in FIG. 5 may also have the same value.

The entry information HPB_RD_ENTRY may correspond to one piece of meta data and may include information associated with a plurality of physical addresses for performing the data read operation based on the data read command HPB_RD_CMD. However, since the data read operation is performed based on the plurality of meta data MDAT1~MDATN transmitted after the meta information transfer command HPB_PREF_CMD, the entry information HPB_RD_ENTRY included in the data read command HPB_RD_CMD may include only a part of the information associated with a part of the plurality of physical addresses (e.g., a first physical address).

FIG. 6 is a diagram illustrating an example of a plurality of meta data used in a method of operating a storage device according to exemplary embodiments.

Referring to FIGS. 2 and 6, the plurality of meta data MDAT1~MDATN may include a plurality of entry information HPB_PREF_ENTRY1, HPB_PREF_ENTRY2, ..., HPB_PREF_ENTRYN.

As with the entry information HPB_RD_ENTRY in FIG. 5, each of the plurality of entry information HPB_PREF_ENTRY1, HPB_PREF_ENTRY2, ..., HPB_PREF_ENTRYN may correspond to one piece of meta data. For example, the first entry information HPB_PREF_ENTRY1 may correspond to the first meta data MDAT1, and the N-th entry information HPB_PREF_ENTRYN may correspond to the N-th meta data MDATN, where N is an integer greater than or equal to two.

The plurality of entry information HPB_PREF_ENTRY1, HPB_PREF_ENTRY2, ..., HPB_PREF_ENTRYN may include information associated with a plurality of physical addresses for performing the data read operation based on the meta information transfer command HPB_PREF_CMD and the data read command HPB_RD_CMD. For example, the plurality of entry information HPB_PREF_ENTRY1, HPB_PREF_ENTRY2, ..., HPB_PREF_ENTRYN may include logical-to-physical mapping information (e.g., logical-to-physical mapping entries) indicating a correspondence relationship between a plurality of logical addresses (e.g., logical block addresses) and a plurality of physical addresses (e.g., physical page numbers).

The meta information transfer ID HPB_PREF_ID described with reference to FIG. 4 may be added together at the front or rear end of the plurality of entry information HPB_PREF_ENTRY1, HPB_PREF_ENTRY2, ..., HPB_PREF_ENTRYN (e.g., at the front or rear end of the plurality of meta data MDAT1~MDATN)

In exemplary embodiments, when the meta information transfer ID HPB_PREF_ID in FIG. 4 and the read ID HPB_RD_ID in FIG. 5 have the same value and when the plurality of meta data MDAT1~MDATN of FIG. 6 is generated and transmitted based on the meta information transfer command HPB_PREF_CMD of FIG. 4, the entry information HPB_RD_ENTRY included in the data read command HPB_RD_CMD of FIG. 5 may be substantially the same as one (e.g., the first entry information HPB_PREF_ENTRY1) of the plurality of entry information HPB_PREF_ENTRY1, HPB_PREF_ENTRY2, ..., HPB_PREF_ENTRYN included in the plurality of meta data MDAT1~MDATN of FIG. 6.

Although FIGS. 4, 5 and 6 illustrate an example in which the meta information transfer ID HPB_PREF_ID has 1 byte, the read ID HPB_RD_ID has 7 bits, each of the logical block address information HPB_PREF_LBA and HPB_RD_LBA has 4 bytes, and each of the entry information HPB_RD_ENTRY, HPB_PREF_ENTRY1, HPB_PREF_ENTRY2, ..., HPB_PREF_ENTRYN has 8 bytes, exemplary embodiments of the inventive concept are not limited thereto.

Figure 7:
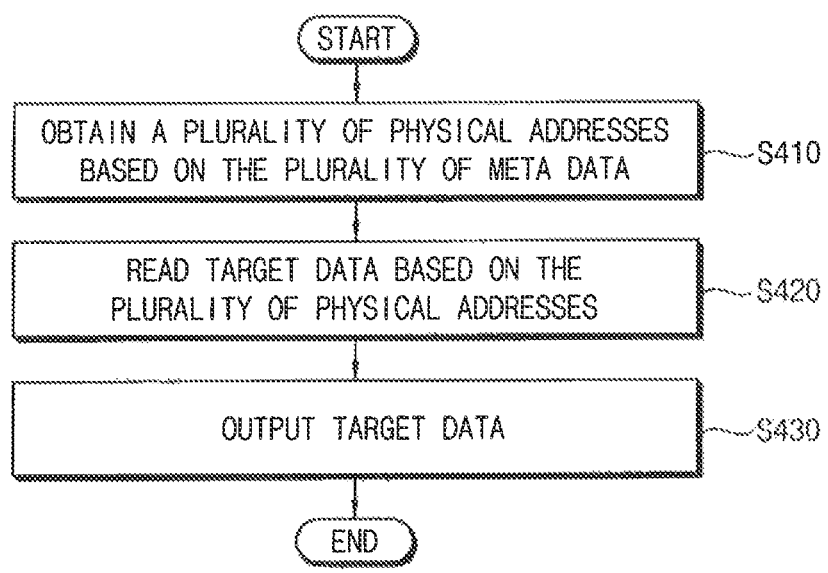
FIG. 7 is a flowchart illustrating an example of performing a data read operation in FIG. 1.

FIG. 7 is a flowchart illustrating an example of performing a data read operation in FIG. 1.

Referring to FIGS. 1, 2, 3A and 7, when performing the data read operation based on the data read command and the plurality of meta data (operation S400), a plurality of physical addresses may be obtained based on the plurality of meta data MDAT1~MDATN (operation S410). For example, the flash translation layer 342 may perform a logical-to-physical address translation based on logical block address information (e.g., the logical block address information HPB_RD_LBA in FIG. 5) included in the data read command HPB_RD_CMD and a plurality of entry information (e.g., the plurality of entry information HPB_PREF_ENTRY1, HPB_PREF_ENTRY2, ..., HPB_PREF_ENTRYN in FIG. 6) included in the plurality of meta data MDAT1~MDATN to obtain the plurality of physical addresses.

The target data RDAT may be read based on the plurality of physical addresses (operation S420), and the target data RDAT may be output (operation S430). For example, the nonvolatile memory 320 may be accessed through the memory interface included in the storage device 300 to read the target data RDAT from the nonvolatile memory 320, and the read target data RDAT may be output through the host interface included in the storage device 300.

Figure 8:
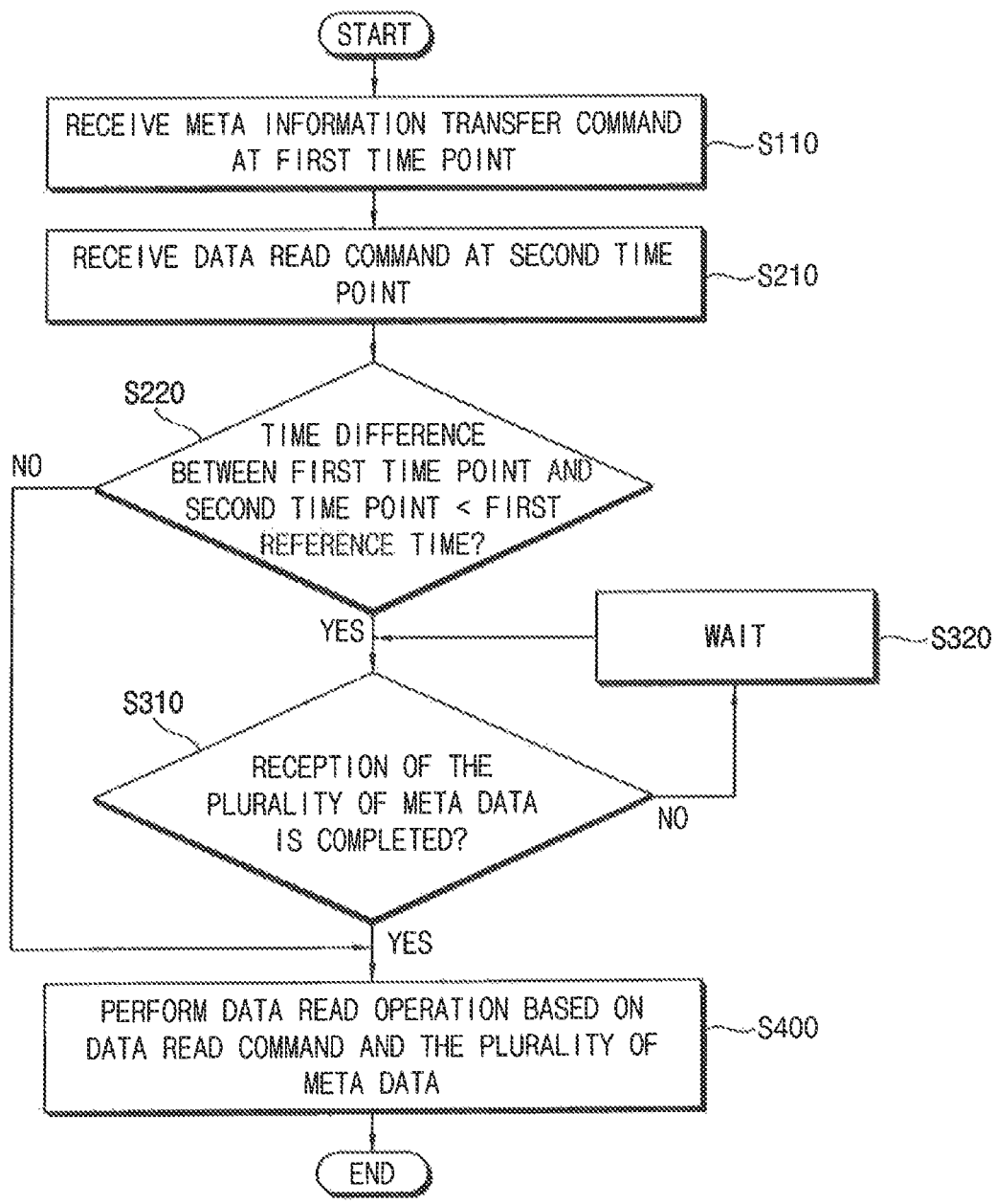
FIG. 8 is a flowchart illustrating an example of the method of operating the storage device of FIG. 1.
Figure 9:
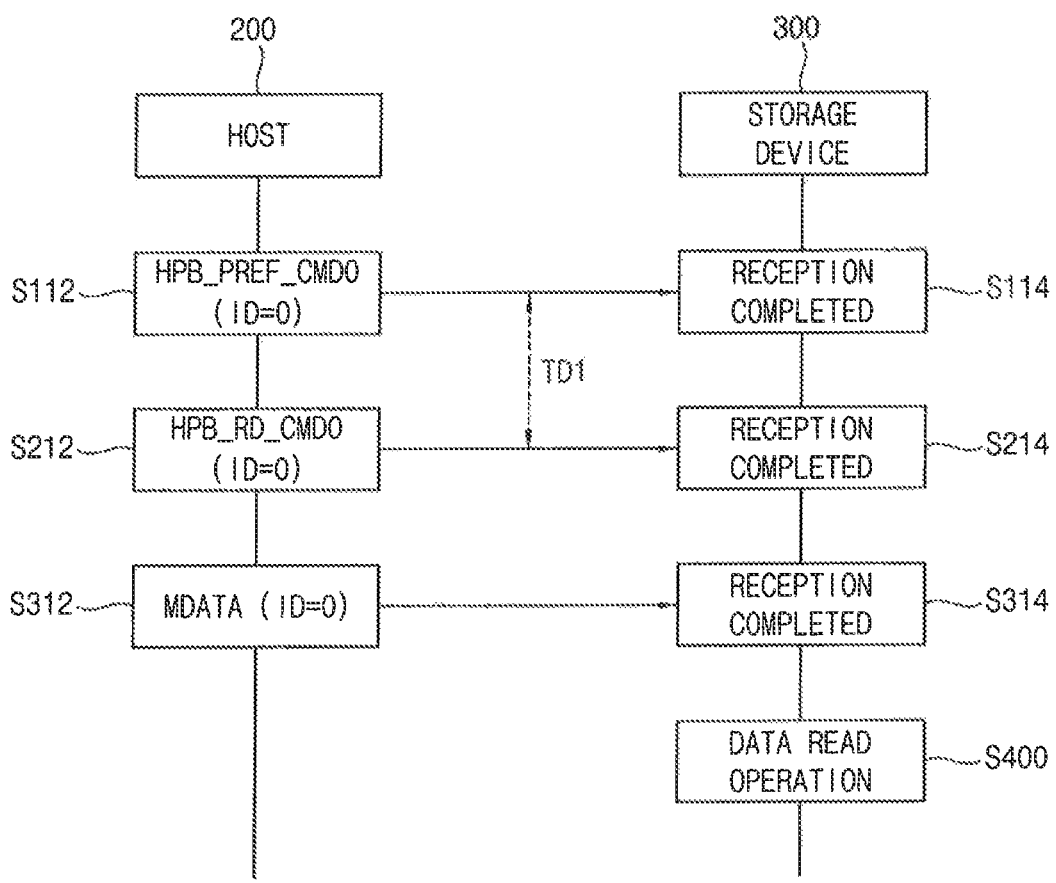
FIG. 9 is a diagram for describing the method of operating the storage device of FIG. 8.

FIG. 8 is a flowchart illustrating an example of the method of operating the storage device of FIG. 1. FIG. 9 is a diagram for describing the method of operating the storage device of FIG. 8.

In the method of operating the storage device 300 according to exemplary embodiments, the meta information transfer command and the data read command may be scheduled together in the same priority order and may be processed asynchronously. In addition, the meta information transfer command may be accompanied by a transmission of the plurality of meta data, and a transmission order and interval of the data read command and the plurality of meta data may be changed after a transmission of the meta information transmission command. FIGS. 8 and 9 illustrate an example in which the data read command is received first and the plurality of meta data is received later.

Referring to FIGS. 1, 2, 8 and 9, when receiving the meta information transfer command (operation S100), a meta information transfer command HPB_PREF_CMD0 may be received at a first time point (operation S110). For example, the host device 200 may transmit the meta information transfer command HPB_PREF_CMD0 whose meta information transfer ID HPB_PREF_ID is 0 (e.g., ID=0) to the storage device 300 (operation S112), and the storage device 300 may complete reception of the meta information transfer command HPB_PREF_CMD0 at the first time point (operation S114).

When receiving the data read command (operation S200), a data read command HPB_RD_CMD0 may be received at a second time point after the first time point (operation S210). For example, the host device 200 may transmit the data read command HPB_RD_CMD0 whose read ID HPB_RD_ID is 0 (e.g., ID=0) to the storage device 300 (operation S212), and the storage device 300 may complete reception of the data read command HPB_RD_CMD0 at the second time point (operation S214).

After reception of the meta information transfer command HPB_PREF_CMD0 and reception of the data read command HPB_RD_CMD0 are completed, it may be checked whether a time difference TD1 between the first time point at which the meta information transfer command HPB_PREF_CMD0 is received and the second time point at which the data read command HPB_RD_CMD0 is received is shorter than a first reference time (operation S220). In addition, when receiving the plurality of meta data (operation S300), it may be checked whether reception of a plurality of meta data MDATA corresponding to the meta information transfer command HPB_PREF_CMD0 is completed (operation S310).

When the time difference TD1 between the first time point and the second time point is shorter than the first reference time (operation S220: YES), and when reception of the plurality of meta data MDATA is not completed (e.g., when the plurality of meta data has not yet been completely received) (operation S310: NO), a wait time may be implemented, in which the method may wait until reception of the plurality of meta data MDATA is completed (e.g., until all of the plurality of meta data MDATA has been received) without performing the data read operation immediately (operation S320). For example, the host device 200 may transmit the plurality of meta data MDATA corresponding to the meta information transfer command HPB_PREF_CMD0 whose meta information transfer ID HPB_PREF_ID is 0 (e.g., ID=0) to the storage device 300 (operation S312), and the storage device 300 may complete reception of the plurality of meta data MDATA at a third time point after the first time point and the second time point (operation S314).

Although FIG. 9 illustrates that a time at which the host device 200 starts transmitting the plurality of meta data MDATA is later than a time at which the host device 200 starts transmitting the data read command HPB_RD_CMD0, exemplary embodiments of the inventive concept are not limited thereto. For example, in exemplary embodiments, the time at which the host device 200 starts transmitting the plurality of meta data MDATA may be earlier than the time at which the host device 200 starts transmitting the data read command HPB_RD_CMD0, and a time at which the storage device 300 completes reception of the plurality of meta data MDATA may be later than a time at which the storage device 300 completes reception of the data read command HPB_RD_CMD0.

When the time difference TD1 between the first time point and the second time point is longer than or equal to the first reference time (operation S220: NO), it may be determined that a sufficient time has elapsed to complete the transmission of the plurality of meta data MDATA, and thus, the data read operation may be performed based on the data read command HPB_RD_CMD0 and the plurality of meta data MDATA (operation S400).

In addition, even if the time difference TD1 between the first time point and the second time point is shorter than the first reference time (operation S220: YES), when reception of the plurality of meta data MDATA is completed (operation S310: YES), the data read operation may be performed based on the data read command HPB_RD_CMD0 and the plurality of meta data MDATA (operation S400).

Thus, in an example according to FIGS. 8 and 9, when a time interval between the meta information transfer command HPB_PREF_CMD0 and the data read command HPB_RD_CMD0 is relatively short and when the transmission of the plurality of meta data MDATA is not completed, the data read operation is not performed immediately, and the data read operation based on the plurality of meta data MDATA may be performed after waiting for completion of the transmission of the plurality of meta data MDATA.

Figure 10:
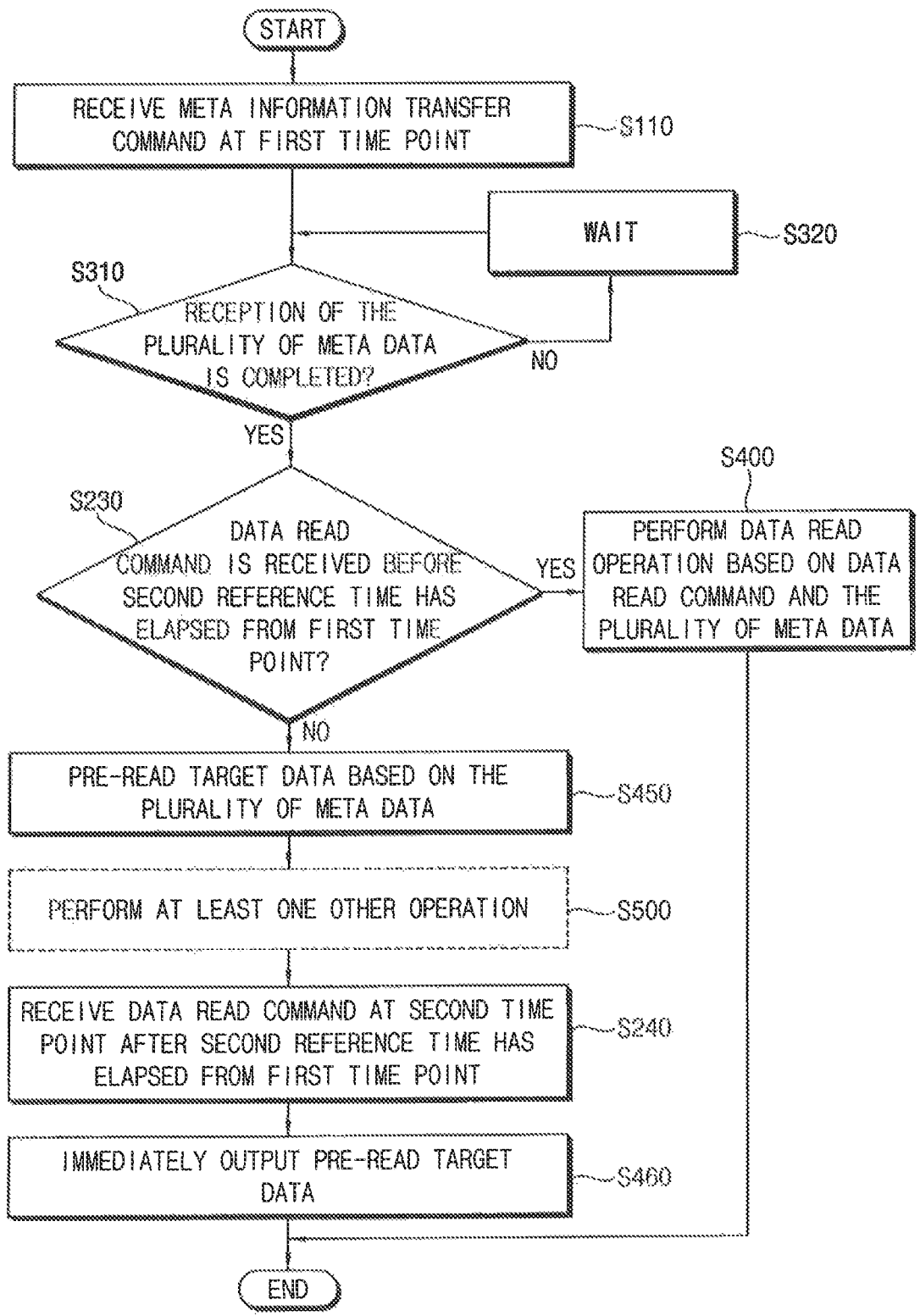
FIG. 10 is a flowchart illustrating an example of the method of operating the storage device of FIG. 1.
Figure 11:
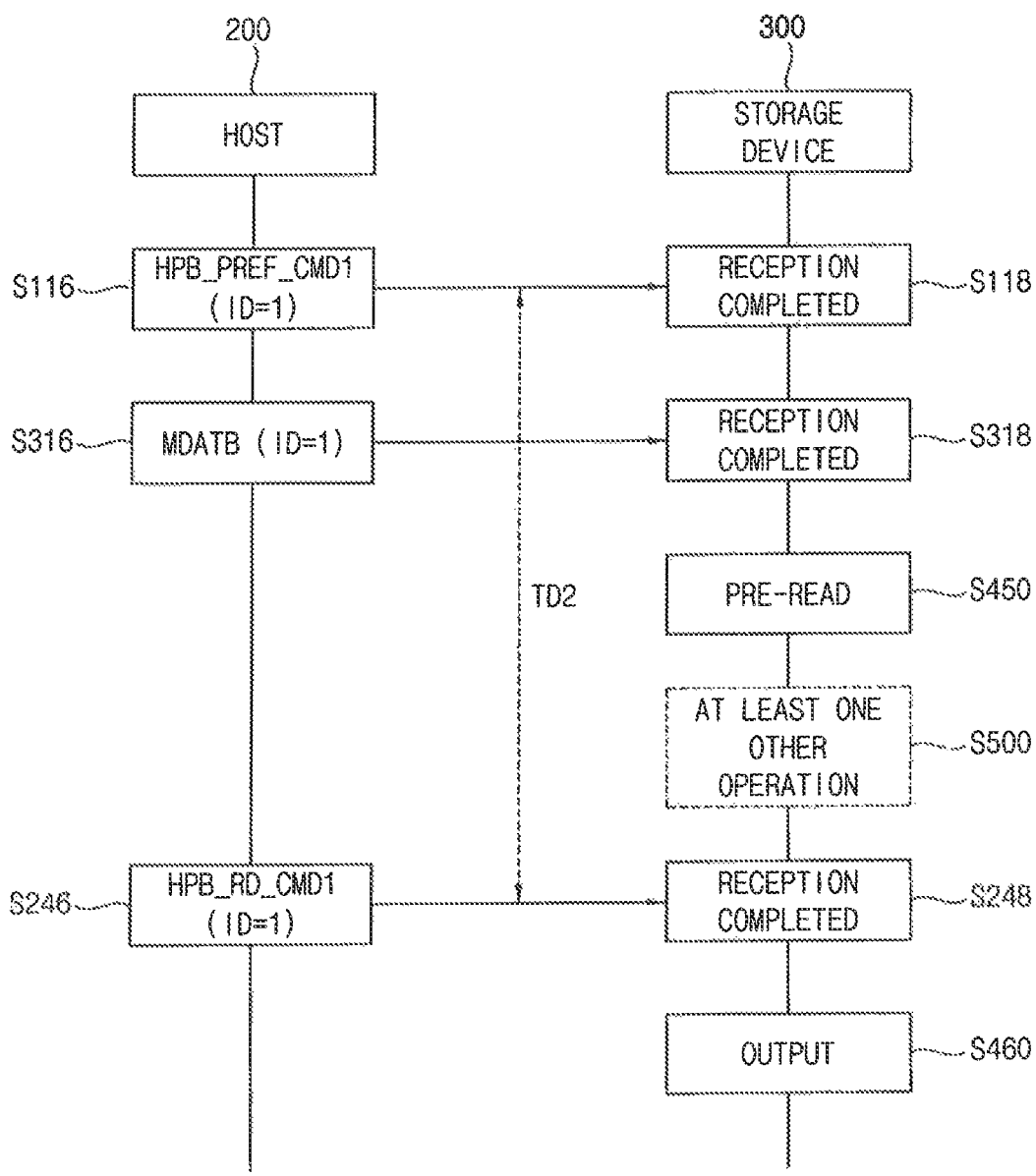
FIG. 11 is a diagram for describing the method of operating the storage device of FIG. 10.

FIG. 10 is a flowchart illustrating an example of the method of operating the storage device of FIG. 1. FIG. 11 is a diagram for describing the method of operating the storage device of FIG. 10.

FIGS. 10 and 11 illustrate an example in which the plurality of meta data is received first and the data read command is received later.

Referring to FIGS. 1, 2, 10 and 11, when receiving the meta information transfer command (operation S100), a meta information transfer command HPB_PREF_CMD1 may be received at a first time point (operation S110). For example, the host device 200 may transmit the meta information transfer command HPB_PREF_CMD1 whose meta information transfer ID HPB_PREF_ID is 1 (e.g., ID=1) to the storage device 300 (operation S116), and the storage device 300 may complete reception of the meta information transfer command HPB_PREF_CMD1 at the first time point (operation S118).

When receiving the plurality of meta data (operation S300), it may be checked whether reception of a plurality of meta data MDATB corresponding to the meta information transfer command HPB_PREF_CMD1 whose meta information transfer ID HPB_PREF_ID is 1 (e.g., ID=1) is completed (operation S310).

When reception of the plurality of meta data MDATB is not completed (operation S310: NO), a wait period is implemented, in which the method waits until reception of the plurality of meta data MDATB is completed (operation S320). For example, the host device 200 may transmit the plurality of meta data MDATB corresponding to the meta information transfer command HPB_PREF_CMD1 to the storage device 300 (operation S316), and the storage device 300 may complete reception of the plurality of meta data MDATB at a fourth time point after the first time point (operation S318).

After reception of the meta information transfer command HPB_PREF_CMD1 and reception of the plurality of meta data MDATB are completed, when receiving the data read command (operation S200), it may be checked whether a data read command HPB_RD_CMD1 whose read ID HPB_RD_ID is 1 (e.g., ID=1) is received before a second reference time has elapsed from the first time point (operation S230).

When the data read command HPB_RD_CMD1 is received before the second reference time has elapsed from the first time point (operation S230: YES), the data read operation may be performed based on the data read command HPB_RD_CMD1 and the plurality of meta data MDATB (operation S400).

When the second reference time has elapsed from the first time point and the data read command HPB_RD_CMD1 is not received (operation S230: NO), the data read operation is not performed immediately because the data read command HPB_RD_CMD1 has not been received. However, the meta information transfer command HPB_PREF_CMD1 and the data read command HPB_RD_CMD1 may be a pair of commands corresponding to a single data read request, and thus, the data read command HPB_RD_CMD1 will always be received if the meta information transfer command HPB_PREF_CMD1 is received first. Therefore, to save time required for the data read operation after the data read command HPB_RD_CMD1 is received, the target data RDAT may be pre-read based on the plurality of meta data MDATB (operation S450) even if the data read command HPB_RD_CMD1 has not yet been received.

In exemplary embodiments, the target data RDAT that is pre-read at operation S450 may be temporarily stored in the buffer memory 330 located inside the storage device 300.

After reception of the meta information transfer command HPB_PREF_CMD1 and reception of the plurality of meta data MDATB are completed, the data read command HPB_RD_CMD0 may be received at a second time point after the second reference time has elapsed from the first time point (operation S240). For example, the host device 200 may transmit the data read command HPB_RD_CMD1 to the storage device 300 (operation S246), and the storage device 300 may complete reception of the data read command HPB_RD_CMD1 at the second time point (operation S248). For example, a time difference TD2 between the first time point at which the meta information transfer command HPB_PREF_CMD1 is received and the second time point at which the data read command HPB_RD_CMD0 is received is longer than the second reference time.

When the time difference TD2 between the first time point and the second time point is longer than the second reference time, the target data RDAT may be pre-read at operation S450, and thus, the target data RDAT may be output immediately after the second time point at which the data read command HPB_RD_CMD0 is received (operation S460).

Thus, in an example according to FIGS. 10 and 11, when a time interval between the meta information transfer command HPB_PREF_CMD1 and the data read command HPB_RD_CMD1 is relatively long and when the data read command HPB_RD_CMD1 is not received even after the transmission of the plurality of meta data MDATB is completed, the target data RDAT may be loaded first, and the target data RDAT may be immediately output when the data read command HPB_RD_CMD1 is received.

In exemplary embodiments, when the time difference TD2 between the first time point and the second time point is longer than the second reference time, at least one operation other than the data read operation based on the meta information transfer command HPB_PREF_CMD1, the data read command HPB_RD_CMD1 and the plurality of meta data MDATB may be additionally and/or selectively performed between the first time point and the second time point (e.g., after the target data RDAT is pre-read and before the data read command HPB_RD_CMD1 is received) (operation S500). The at least one other operation may include, for example, data read/write/erase operations based on other commands and an operation (e.g., a garbage collection operation) internally performed in the storage device 300 without any command.

Although an operation of the storage device 300 according to exemplary embodiments is described based on the method of operating the storage device 300 in which two commands (e.g., the meta information transfer command and the data read command) and associated meta data are received based on a single data read request and the data read operation is performed based on the received meta data, exemplary embodiments of the inventive concept are not limited thereto. For example, in exemplary embodiments, the storage device 300 may further perform a normal data read operation based on a single data read command including a single piece of meta data.

Figure 12:
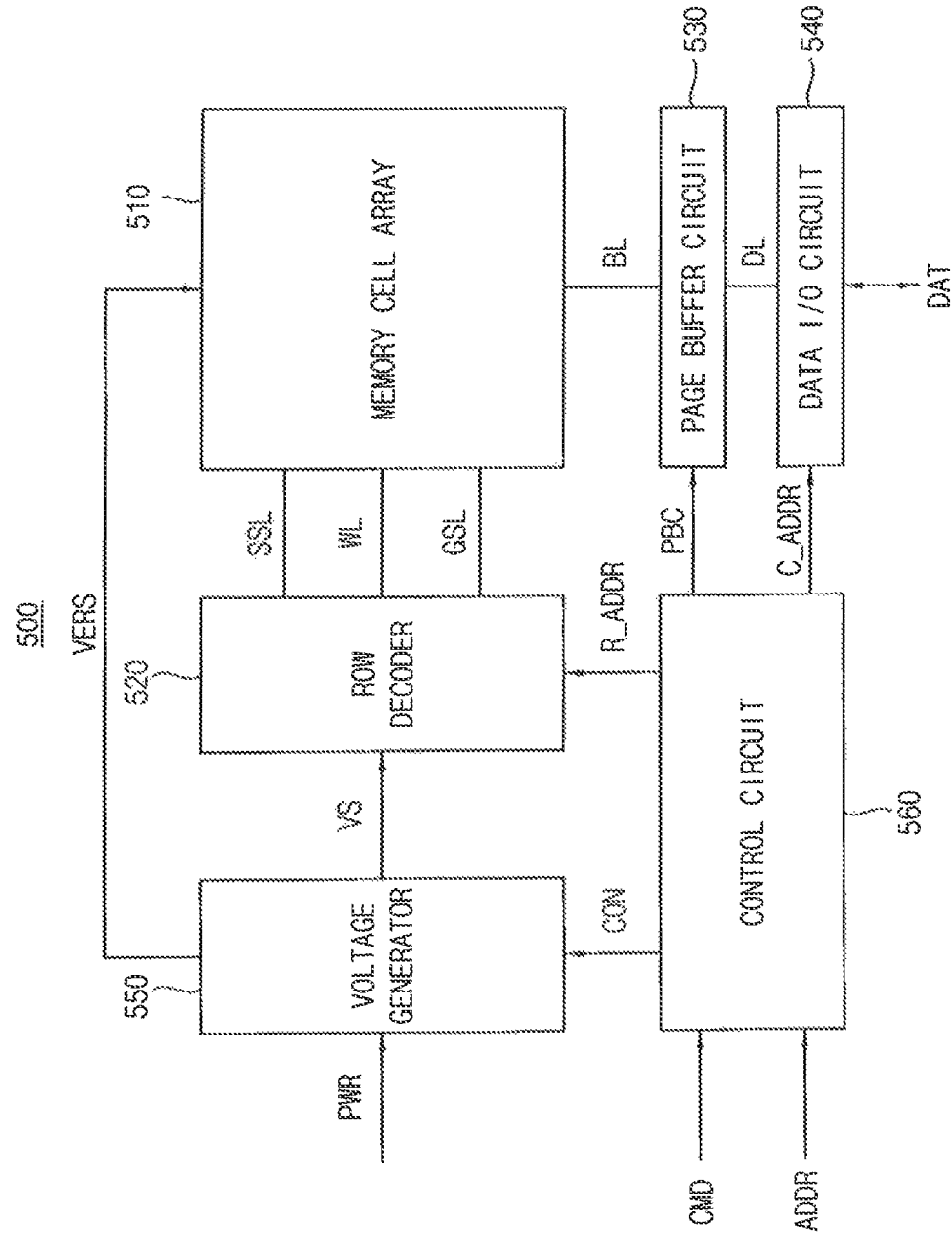
FIG. 12 is a block diagram illustrating a nonvolatile memory device included in a storage device according to exemplary embodiments.

FIG. 12 is a block diagram illustrating a nonvolatile memory device included in a storage device according to exemplary embodiments.

Referring to FIG. 12, a nonvolatile memory device 500 includes a memory cell array 510, a row decoder 520, a page buffer circuit 530, a data input/output (I/O) circuit 540, a voltage generator 550 and a control circuit 560.

The memory cell array 510 is connected to the row decoder 520 via a plurality of string selection lines SSL, a plurality of wordlines WL and a plurality of ground selection lines GSL. The memory cell array 510 is further connected to the page buffer circuit 530 via a plurality of bitlines BL.

The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks each of which includes a plurality of memory cells. In exemplary embodiments, the plurality of memory cells may be arranged in a two-dimensional (2D) array structure or a three-dimensional (3D) vertical array structure.

In exemplary embodiments of the present inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In exemplary embodiments of the present inventive concept, the 3D memory array includes vertical NAND strings that are vertically oriented such that at least one memory cell is located over another memory cell. The at least one memory cell may include a charge trap layer.

The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from a memory controller (e.g., the host device 200 and/or the storage controller 310 in FIG. 2), and controls erasure, programming and read operations of the nonvolatile memory device 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and a data recovery read operation.

For example, the control circuit 560 may generate control signals CON, which are used for controlling the voltage generator 550, and may generate a control signal PBC for controlling the page buffer circuit 530, based on the command CMD, and may generate a row address R_ADDR and a column address C_ADDR based on the address ADDR. The control circuit 560 may provide the row address R_ADDR to the row decoder 520 and may provide the column address C_ADDR to the data I/O circuit 540.

The row decoder 520 may be connected to the memory cell array 510 via the plurality of string selection lines SSL, the plurality of wordlines WL and the plurality of ground selection lines GSL.

For example, in the data erase/write/read operations, the row decoder 520 may determine at least one of the plurality of wordlines WL as a selected wordline, and may determine the remainder of the plurality of wordlines WL other than the selected wordline as unselected wordlines, based on the row address R_ADDR.

In addition, in the data erase/write/read operations, the row decoder 520 may determine at least one of the plurality of string selection lines SSL as a selected string selection line, and may determine the remainder of the plurality of string selection lines SSL other than the selected string selection line as unselected string selection lines, based on the row address R_ADDR.

Further, in the data erase/write/read operations, the row decoder 520 may determine at least one of the plurality of ground selection lines GSL as a selected ground selection line, and may determine the remainder of the plurality of ground selection lines GSL other than the selected ground selection line as unselected ground selection lines, based on the row address R_ADDR.

The voltage generator 550 may generate voltages VS that are used for an operation of the nonvolatile memory device 500 based on supplied power PWR and the control signals CON. The voltages VS may be applied to the plurality of string selection lines SSL, the plurality of wordlines WL and the plurality of ground selection lines GSL via the row decoder 520. In addition, the voltage generator 550 may generate an erase voltage VERS that is used for the data erase operation based on the power PWR and the control signals CON. The erase voltage VERS may be applied to the memory cell array 510 directly or via one of the bitlines BL.

For example, during the erase operation, the voltage generator 550 may apply the erase voltage VERS to a common source line contact and/or the bitline BL of a memory block (e.g., a selected memory block) and may apply an erase permission voltage (e.g., a ground voltage) to all wordlines of the memory block or a portion of the wordlines via the row decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the row decoder 520. In addition, during the program verification operation, the voltage generator 550 may apply a program verification voltage to the selected wordline and may apply a verification pass voltage to the unselected wordlines via the row decoder 520.

In addition, during the normal read operation, the voltage generator 550 may apply a read voltage to the selected wordline and may apply a read pass voltage to the unselected wordlines via the row decoder 520. During the data recovery read operation, the voltage generator 550 may apply the read voltage to a wordline adjacent to the selected wordline and may apply a recovery read voltage to the selected wordline via the row decoder 520.

The page buffer circuit 530 may be connected to the memory cell array 510 via the plurality of bitlines BL. The page buffer circuit 530 may include a plurality of page buffers. In exemplary embodiments, each page buffer may be connected to one bitline BL. In exemplary embodiments, each page buffer may be connected to two or more bitlines BL.

The page buffer circuit 530 may store data DAT to be programmed into the memory cell array 510 or may read data DAT sensed from the memory cell array 510. For example, the page buffer circuit 530 may operate as a write driver or a sensing amplifier according to an operation mode of the nonvolatile memory device 500.

The data I/O circuit 540 may be connected to the page buffer circuit 530 via data lines DL. The data I/O circuit 540 may provide the data DAT from outside of the nonvolatile memory device 500 to the memory cell array 510 via the page buffer circuit 530, or may provide the data DAT from the memory cell array 510 to the outside of the nonvolatile memory device 500, based on the column address C_ADDR.

Figure 13:
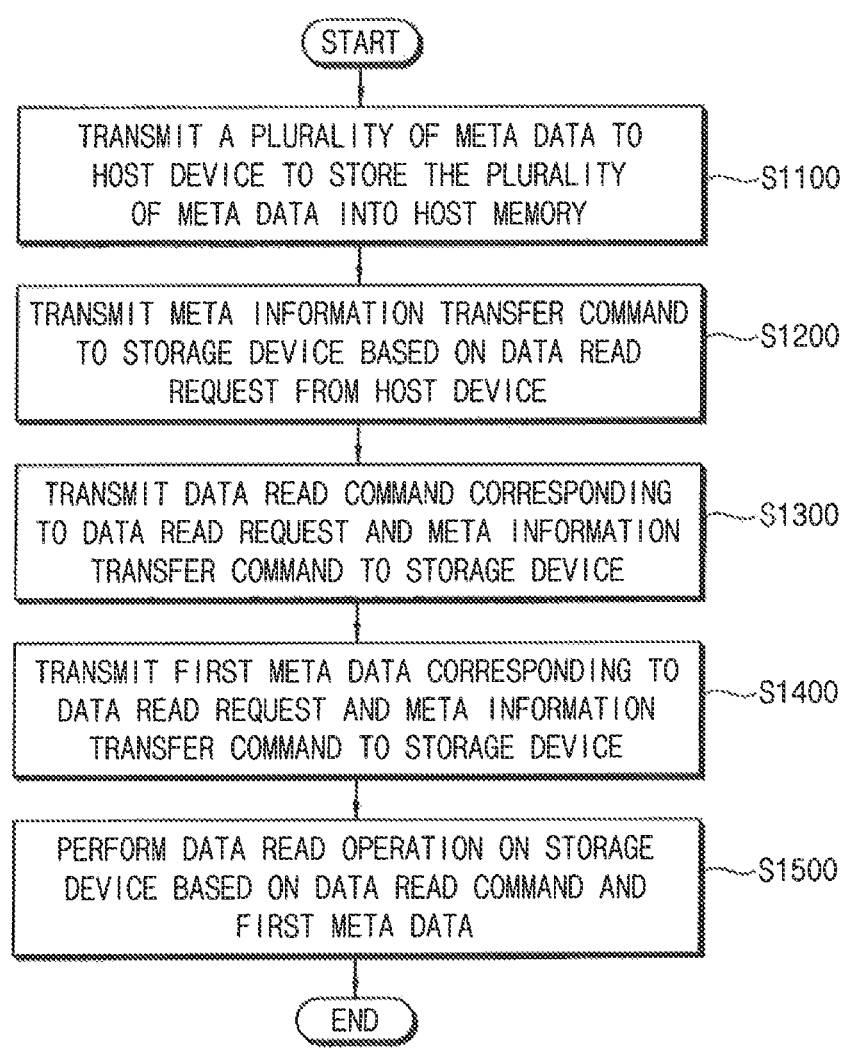
FIGS. 13 and 14 are flowcharts illustrating a method of operating a storage system according to exemplary embodiments.
Figure 14:
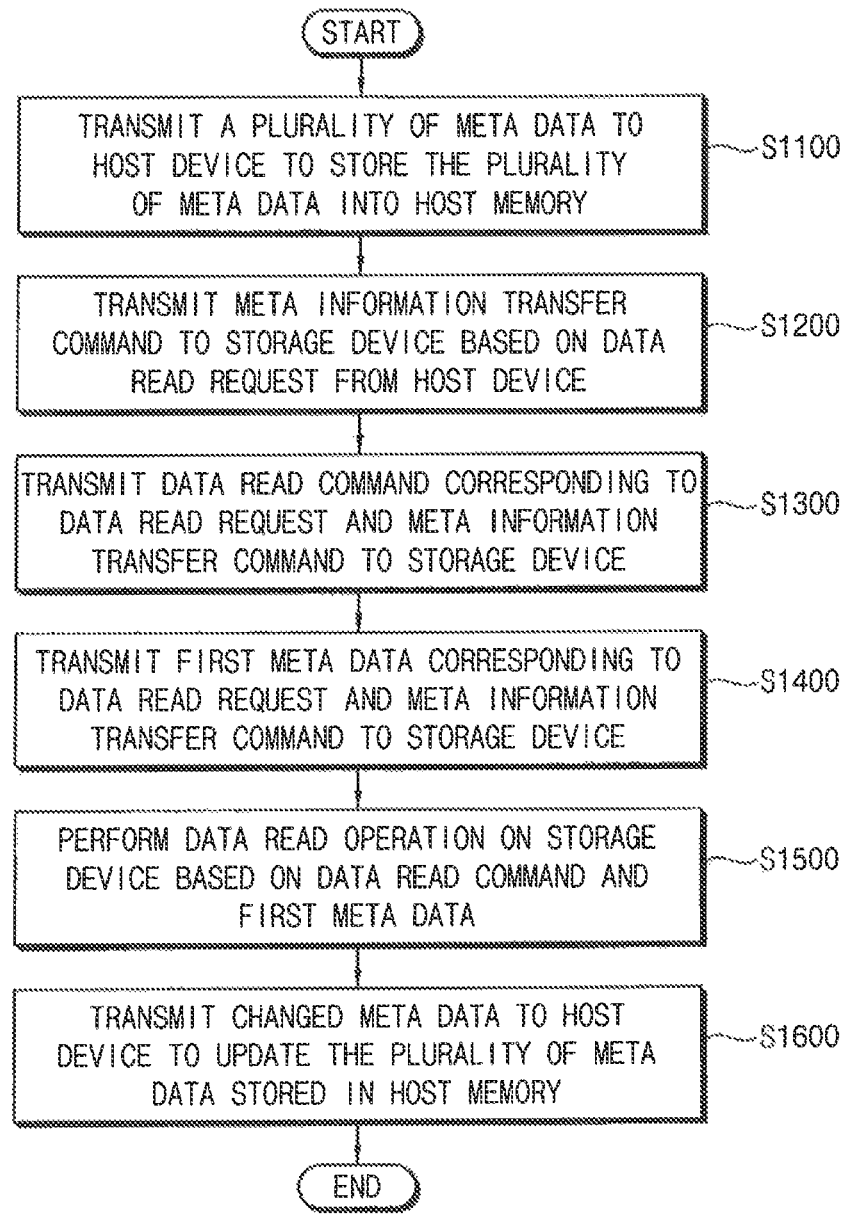

FIGS. 13 and 14 are flowcharts illustrating a method of operating a storage system according to exemplary embodiments.

Referring to FIG. 13, a storage system according to exemplary embodiments includes a host device and a storage device. A configuration of the storage system may be substantially the same as that described above with reference to FIG. 2. For example, the host device and the storage device referred to with reference to FIGS. 13 and 14 may be the host device 200 and the storage device 300, respectively.

In a method of operating the storage system according to exemplary embodiments, the storage device transmits a plurality of meta data stored in the storage device to the host device to store the plurality of meta data into a host memory included in the host device (operation S1100). For example, operation S1100 may be performed when the storage system is booted or reset, and the storage system may operate based on the HPB scheme in which the storage device is accessed using the plurality of meta data stored in the host memory.

The host device transmits a meta information transfer command to the storage device based on a data read request from the host device (operation S1200), transmits a data read command corresponding to the data read request and the meta information transfer command to the storage device (operation S1300), and transmits first meta data corresponding to the data read request and the meta information transfer command to the storage device (operation S1400). The first meta data are a part of the plurality of meta data. A data read operation is performed on the storage device based on the data read command and the first meta data (operation S1500).

Operations S1200, S1300, S1400 and S1500 in FIG. 13 may be similar to operations S100, S200, S300 and S400 in FIG. 1, respectively, and may be performed based on examples described with reference to FIGS. 1 through 11.

Referring to FIG. 14, in a method of operating a storage system according to exemplary embodiments, the method of FIG. 14 may be substantially the same as the method of FIG. 13, except that operation S1600 is added to the method of FIG. 14.

When at least one of the plurality of meta data is changed, the changed meta data may be transmitted from the storage device to the host device to update the plurality of meta data stored in the host memory (operation S1600).

In exemplary embodiments, operation S1600 may be performed at any time after operation S1100 is performed.

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

Figure 15:
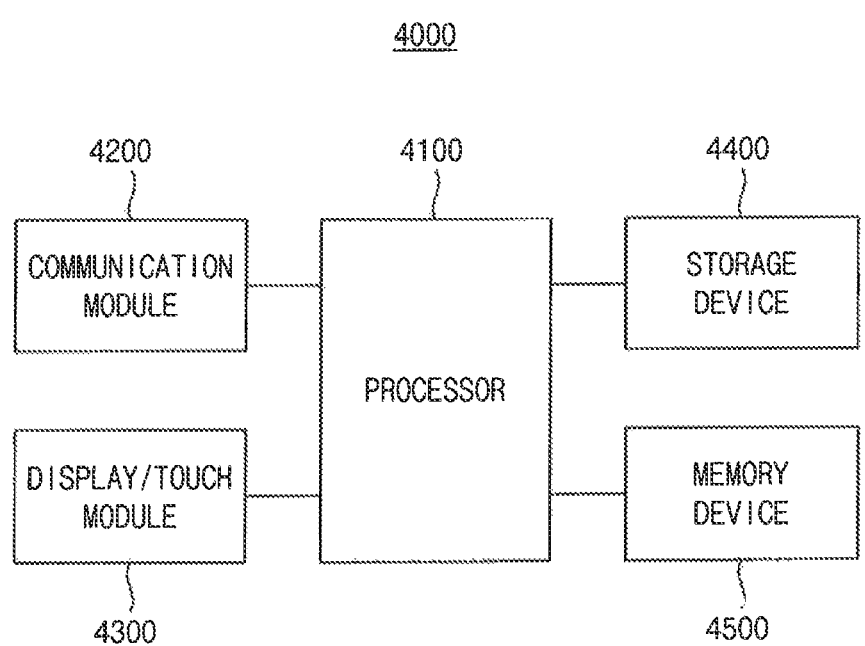
FIG. 15 is a block diagram illustrating an electronic system according to exemplary embodiments.

FIG. 15 is a block diagram illustrating an electronic system according to exemplary embodiments.

Referring to FIG. 15, an electronic system 4000 includes at least one processor 4100, a communication module 4200, a display/touch module 4300, a storage device 4400 and a memory device 4500. The electronic system 4000 may be, for example, any mobile system or any computing system.

The processor 4100 controls operations of the electronic system 4000. The processor 4100 may execute an operating system and at least one application to provide, for example, an Internet browser, games, videos, etc. The communication module 4200 is implemented to perform wireless or wired communications with an external device. The display/touch module 4300 is implemented to display data processed by the processor 4100 and/or to receive data through a touch panel. The storage device 4400 is implemented to store user data, and is driven based on the method of operating the storage device according to the exemplary embodiments described herein. The memory device 4500 temporarily stores data used for processing operations of the electronic system 4000. The processor 4100 and the memory device 4500 in FIG. 15 may correspond to the processor 210 and the host memory 220 included in the host device 200 of FIG. 2, respectively.

Exemplary embodiments of the inventive concept may be applied to various electronic devices and electronic systems including the storage device and the storage system. For example, exemplary embodiments of the inventive concept may be applied to systems such as a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an Internet of things (IoT) device, an Internet of everything (IoE) device, an e-book reader, a virtual reality (VR) device, an augmented reality (AR) device, a robotic device, etc.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of operating a storage device, the method comprising:
 receiving, at the storage device, a meta information transfer command based on one data read request, wherein the meta information transfer command is received from a host device;
 receiving, at the storage device, a data read command corresponding to the one data read request and the meta information transfer command, wherein the data read command is received from the host device, wherein the meta information transfer command and the data read command are generated in one pair based on the one data read request, wherein the meta information transfer command comprises logical block address information that indicates at least one logical block address for a data read operation, and a meta information transfer identification (ID) that identifies the meta information transfer command and the data read command generated in the one pair;

receiving, at the storage device, a plurality of meta data corresponding to the one data read request and the meta information transfer command, wherein the plurality of meta data is received from the host device, wherein the plurality of meta data comprises entry information indicating at least one physical address for performing the data read operation; and performing the data read operation, at the storage device, based on the data read command and the plurality of meta data.

2. The method of claim 1, wherein:
the data read command includes a read ID corresponding to the meta information transfer ID.

3. The method of claim 2, wherein the meta information transfer ID and the read ID have a same value.

4. The method of claim 1, wherein the at least one physical address is included in a plurality of physical addresses for performing the data read operation.

5. The method of claim 4, wherein the plurality of meta data includes logical-to-physical mapping information indicating a correspondence relationship between a plurality of logical addresses and the plurality of physical addresses.

6. The method of claim 1, wherein performing the data read operation comprises:
obtaining a plurality of physical addresses, which includes the at least one physical address, based on the plurality of meta data;
reading target data based on the plurality of physical addresses; and
outputting the target data.

7. The method of claim 6, wherein, when a time difference between a first time point at which the meta information transfer command is received and a second time point at which the data read command is received is shorter than a first reference time and when reception of the plurality of meta data is not completed, a wait time is implemented in which the target data is read based on the plurality of meta data after the reception of the plurality of meta data is completed.

8. The method of claim 6, wherein, when a time difference between a first time point at which the meta information transfer command is received and a second time point at which the data read command is received is longer than a second reference time and when reception of the plurality of meta data is completed, the target data is pre-read based on the plurality of meta data before the data read command is received, and the target data is output immediately after the second time point at which the data read command is received.

9. The method of claim 8, wherein at least one operation other than the data read operation is performed between the first time point and the second time point.

10. The method of claim 1, wherein the one data read request is a large-scale read request in which a large amount of data greater than a predetermined size are read at one time.

11. The method of claim 10, wherein the one data read request is a single read request.

12. The method of claim 1, wherein the plurality of meta data are transmitted through a direct memory access (DMA) interface.

13. A storage device, comprising:
a plurality of nonvolatile memories configured to store a plurality of data; and
a storage controller configured to control an operation of the plurality of nonvolatile memories, wherein the storage controller is configured to receive a meta information transfer command based on one data read request, to receive a data read command corresponding to the one data read request and the meta information transfer command, to receive a plurality of meta data corresponding to the one data read request and the meta information transfer command, and to perform a data read operation based on the data read command and the plurality of meta data, wherein the meta information transfer command, the data read command, and the plurality of meta data are received from a host device, wherein the meta information transfer command and the data read command are generated in one pair based on the one data read request, wherein the meta information transfer command comprises logical block address information that indicates at least one logical block address for the data read operation, and a meta information transfer identification (ID) that identifies the meta information transfer command and the data read command generated in the one pair, wherein the plurality of meta data comprises entry information indicating at least one physical address for performing the data read operation.

14. The storage device of claim 13, further comprising:
a buffer memory configured to temporarily store target data that is pre-read based on the plurality of meta data before the data read command is received when a time difference between a first time point at which the meta information transfer command is received and a second time point at which the data read command is received is longer than a reference time and when reception of the plurality of meta data is complete.

15. The storage device of claim 14, wherein the buffer memory includes a volatile memory.

16. The storage device of claim 13, wherein the storage device is a universal flash storage (UFS).

17. A method of operating a storage system comprising a host device and a storage device, the method comprising:
transmitting a plurality of meta data stored in the storage device to the host device;
storing the plurality of meta data in a host memory included in the host device;
transmitting a meta information transfer command from the host device to the storage device based on one data read request;
transmitting a data read command corresponding to the one data read request and the meta information transfer command from the host device to the storage device;
transmitting first meta data corresponding to the one data read request and the meta information transfer command from the host device to the storage device, wherein the first meta data is a part of the plurality of meta data; and performing a data read operation on the storage device based on the data read command and the first meta data, wherein the meta information transfer command and the data read command are generated in one pair based on the one data read request, wherein the meta information transfer command comprises logical block address information that indicates at least one logical block address for the data read operation, and a meta information transfer identification (ID) that identifies the meta information transfer command and the data read command generated in the one pair, wherein the plurality of meta data comprises entry information indicating at least one physical address for performing the data read operation.

18. The method of claim 17, wherein, when at least one of the plurality of meta data is changed, the changed meta data is transmitted to the host device and the plurality of meta data stored in the host memory is updated based on the changed meta data.

19. The method of claim 17, wherein:
the host memory includes a volatile memory, and
a capacity of the host memory is greater than a capacity of a buffer memory included in the storage device.

20. The method of claim 17, wherein the storage system is one of a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an Internet of things (IoT) device, an e-book reader, a virtual reality (VR) device, an augmented reality (AR) device, and a robotic device.

* * * * *